United States Patent
Lee (10) Patent No.: US 8,739,117 B2
(45) Date of Patent: May 27, 2014

(54) METHOD AND SYSTEM FOR PROVIDING DEVELOPER INTERFACE

(75) Inventor: Dong Soo Lee, Yongin-si (KR)

(73) Assignee: NHN Entertainment Corporation, Seongnam-si (KR)

(*) Notice: Subject to any disclaimer, the term of this patent is extended or adjusted under 35 U.S.C. 154(b) by 250 days.

(21) Appl. No.: 13/170,598

(22) Filed: Jun. 28, 2011

(65) Prior Publication Data

US 2012/0005651 A1 Jan. 5, 2012

(30) Foreign Application Priority Data

Jul. 1, 2010 (KR) .................. 10-2010-0063582

(51) Int. Cl.
*G06F 9/44* (2006.01)
*G06F 9/445* (2006.01)

(52) U.S. Cl.
USPC ............ 717/107; 717/164; 717/175; 717/178

(58) Field of Classification Search
None
See application file for complete search history.

(56) References Cited

U.S. PATENT DOCUMENTS

| | | | | |
|---|---|---|---|---|
| 5,818,445 A * | 10/1998 | Sanderson et al. | ............ | 715/744 |
| 7,779,385 B2 * | 8/2010 | Hegde et al. | .................. | 717/107 |
| 8,239,856 B2 * | 8/2012 | Bull et al. | ..................... | 717/175 |
| 8,291,408 B1 * | 10/2012 | Czymontek | .................. | 717/178 |
| 2004/0111720 A1 * | 6/2004 | Vertes | ........................... | 717/164 |
| 2005/0262493 A1 * | 11/2005 | Schmidt et al. | ............... | 717/164 |
| 2005/0289509 A1 * | 12/2005 | Illowsky et al. | .............. | 717/107 |
| 2006/0225072 A1 * | 10/2006 | Lari et al. | ....................... | 717/175 |
| 2008/0147693 A1 * | 6/2008 | Clemm et al. | .................. | 707/101 |
| 2008/0163202 A1 * | 7/2008 | Kembel et al. | ................ | 717/178 |
| 2008/0178154 A1 * | 7/2008 | Basler et al. | .................. | 717/124 |
| 2008/0222618 A1 * | 9/2008 | Valtchev | ...................... | 717/139 |
| 2008/0256532 A1 * | 10/2008 | Xie et al. | ....................... | 717/178 |
| 2009/0019436 A1 * | 1/2009 | Hartz et al. | .................... | 717/178 |
| 2009/0158264 A1 * | 6/2009 | Burka et al. | .................. | 717/164 |
| 2009/0183182 A1 * | 7/2009 | Parthasarathy et al. | ....... | 719/321 |
| 2009/0260004 A1 * | 10/2009 | Datta et al. | .................... | 717/175 |
| 2009/0282403 A1 * | 11/2009 | Poole et al. | .................... | 717/178 |
| 2010/0199261 A1 * | 8/2010 | Shenfield et al. | ............. | 717/107 |
| 2011/0161430 A1 * | 6/2011 | Callanan et al. | ............. | 709/206 |
| 2011/0191695 A1 * | 8/2011 | Dinka et al. | .................. | 715/753 |
| 2013/0326474 A1 * | 12/2013 | Lane | ............................. | 717/107 |

OTHER PUBLICATIONS

Abdille Hagi Abdullahi, Component-based Software Development, 2008, pp. 18-34.*
Makarand Utpat, Delivering and sharing components using Smalltalk link libraries, 1996, pp. 9-11.*
Daniel Cazzulino, Leveraging .NET Components and IDE Integration: UI AOP in an MVC use case, 2005, pp. 7-15.*

* cited by examiner

*Primary Examiner* — Thuy Dao
*Assistant Examiner* — Mongbao Nguyen
(74) *Attorney, Agent, or Firm* — H.C. Park & Associates, PLC

(57) ABSTRACT

A method and system for generating a developer interface using a loaded program. The method of generating a developer interface may share a plurality of components included in a loaded program through a communication interface, and generate a new program using components selected from among the plurality of shared components through the developer interface.

9 Claims, 5 Drawing Sheets

METHOD AND SYSTEM FOR PROVIDING DEVELOPER INTERFACE

CROSS REFERENCE TO RELATED APPLICATION

This application claims priority from and the benefit of Korean Patent Application No. 10-2010-0063582, filed on Jul. 1, 2010, which is hereby incorporated by reference for all purposes as if fully set forth herein.

BACKGROUND OF THE INVENTION

Exemplary embodiments of the present invention relate to a method and system for providing a developer interface, and more particularly, to a method and system for providing a developer interface according to an execution of components registered using a communication bus.

DISCUSSION OF THE BACKGROUND

Currently, one significant issue in developing software may be reusability. Reuse of developed software for other various pieces of software may have merits such as cost cutting due to elimination of a need for additional development, stability due to use of existing developed software, and the like.

Reuse of software has generally been limited to reuse of code or a compiled binary file. A program developer may quote and compile the source file in a program written by the program developer so as to reuse code made by another developer, and may copy files to be reused in a program of the program developer so as to reuse a program such as an executable (EXE) program and a dynamic linked library (DLL) program.

However, enhanced reusability may be provided when another active program loaded on a memory is reused as necessary, transcending code or developed code such as DLL.

For example, when a gaming program reuses a messenger program that is being operated, the gaming program may quote logged user information in the messenger program and invite the corresponding user, using the logged user information, to join a game.

SUMMARY

Exemplary embodiments of the present invention provide a method and system for sharing data between multiple components registered using a communication bus.

Exemplary embodiments of the present invention also provide a method and system for adding a new component while executing multiple registered components.

Exemplary embodiments of the present invention also provide a method and system for deregistering a component that is being registered, using a communication bus.

Exemplary embodiments of the present invention also provide a method and system for generating a new program using components included in a loaded program, utilizing a developer interface.

An exemplary embodiment of the present invention discloses a method of providing a developer interface, the method including loading a program (1) including a plurality of components, and generating a program (3) using at least one component among the plurality of components included in the loaded program (1).

The method may further include loading at least one program (2) sharing a component with the loaded program (1).

The generating includes generating the program (3) using at least one component included in the loaded program (1) and at least one component included in the at least one program (2).

The method may further include displaying, through a developer interface, a plurality of components included in the loaded program (1) and the at least one program (2).

The generating includes receiving an input of at least one component selected from among the plurality of components, displayed through the developer interface, that are included in the loaded program (1) and the at least one program (2), and generating the program (3) by combining the received input of the at least one selected component.

The developer interface may correspond to a dynamic developer interface based on Extensible Mark-up Language (XML).

A type of the at least one component may correspond to one of a dynamic linked library (DLL) and an executable program (EXE).

An exemplary embodiment of the present invention discloses a system for a developer interface, the system including a program loading unit to load a program (1) including a plurality of components, and a generator to generate a program (3) using at least one component among the plurality of components included in the loaded program (1).

The program loading unit may load at least one program (2) sharing a component with the loaded program (1).

The generator may generate the program (3) using at least one component included in the loaded program (1) and at least one component included in the at least one program (2).

The system may further include an interface display unit to display, through a developer interface, a plurality of components included in the loaded program (1) and the at least one program (2).

The generator may include a component selector to receive an input of at least one component selected from among the plurality of components, displayed through the developer interface, that are included in the loaded program (1) and the at least one program (2), and a program generator to generate the program (3) by combining the received input of the at least one component selected.

According to embodiments of the present invention, it is possible to share data between multiple components registered using a communication bus.

According to embodiments of the present invention, it is possible to add a new component while executing multiple registered components.

According to embodiments of the present invention, it is possible to deregister a component that is being registered, using a communication bus.

According to embodiments of the present invention, it is possible to adjust a component that is being registered, using a communication bus.

DETAILED DESCRIPTION OF THE ILLUSTRATED EMBODIMENTS

It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 1:
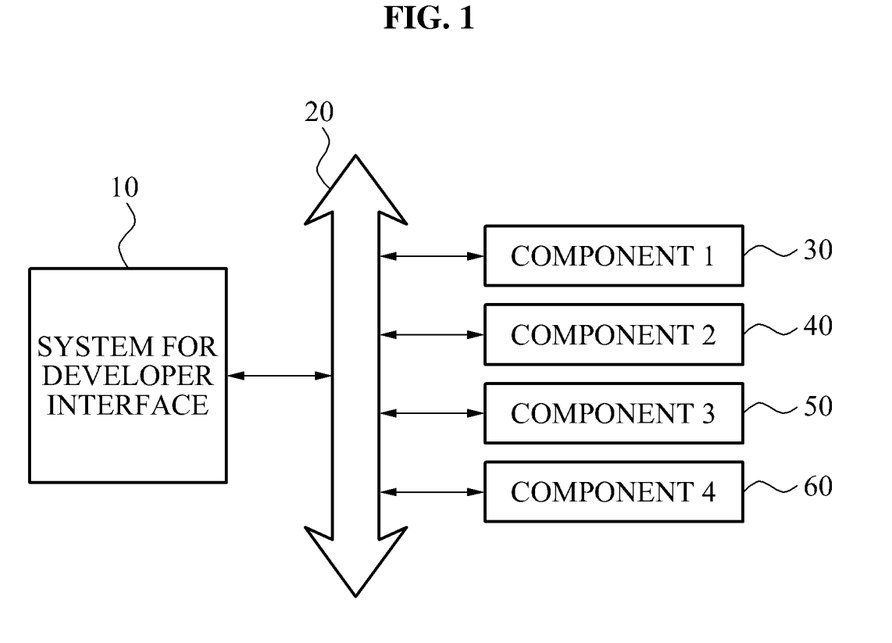
FIG. 1 is a diagram illustrating a process of registering a component using a communication bus according to exemplary embodiments of the present invention.

FIG. 1 is a diagram illustrating a process of registering a component using a communication bus 20 according to exemplary embodiments of the present invention.

Referring to FIG. 1, when a component (1) 30, a component (2) 40, and a component (4) 60 are already registered using the communication bus 20 and a component (3) 50 is to be registered, a system for a developer interface 10 may register the component (3) 50 using the communication bus 20.

In this instance, the system for a developer interface 10 may inform the component (1) 30, the component (2) 40, and the component (4) 60 that the component (3) 50 is newly registered. Then, the already registered components (1, 2, and 4) 30, 40, and 60 and the newly registered component (3) 50 may be shared with each other through the communication bus 20. For example, data included in the components (1, 2, and 4) 30, 40, and 60 and the newly registered component (3) 50 may be shared with each other through the communication bus 20. Here, data included in the components (1 through 4) 30 through 60 may correspond to Extensible Mark-up Language (XML) data. In this instance, XML data may be defined using document type definition (DTD).

Figure 2:
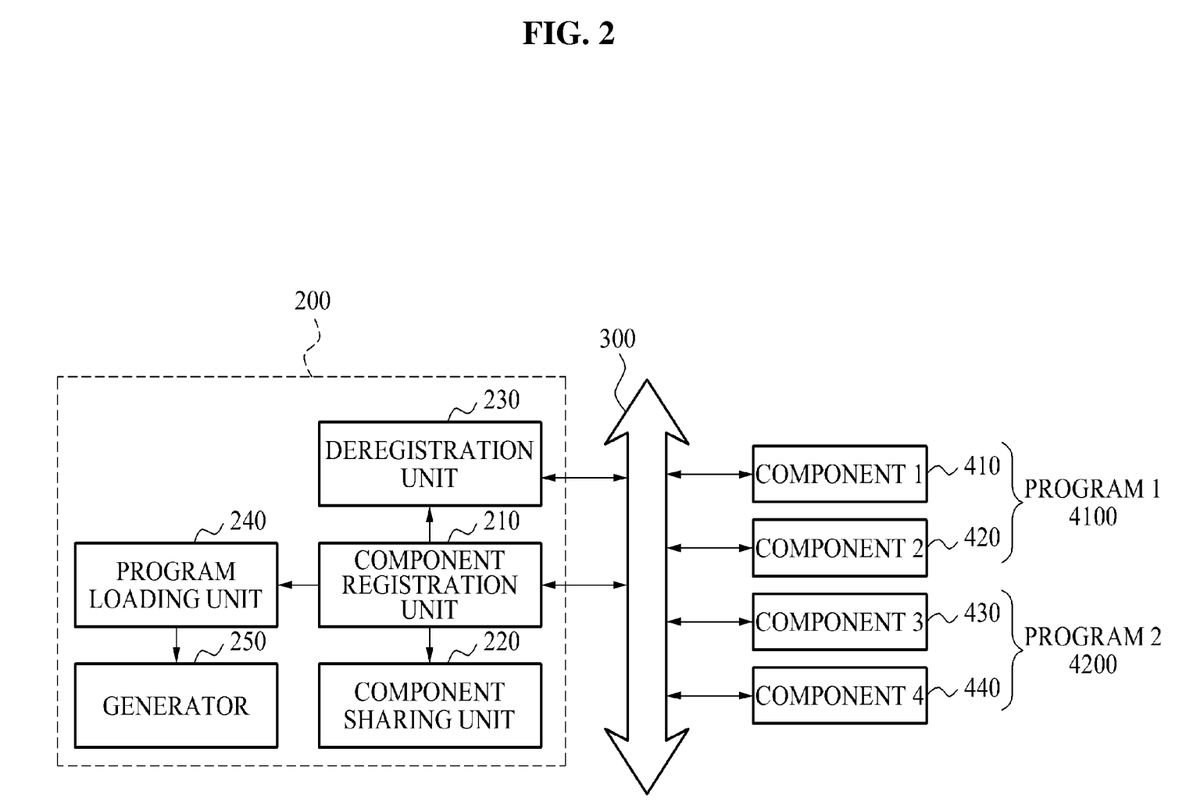
FIG. 2 is a diagram illustrating a configuration of a system for a developer interface according to exemplary embodiments of the present invention.

FIG. 2 is a diagram illustrating a configuration of a system for a developer interface 200 according to exemplary embodiments of the present invention.

Referring to FIG. 2, the system for a developer interface 200 may include a component registration unit 210, a component sharing unit 220, a deregistration unit 230, a program loading unit 240, and a generator 250.

The component registration unit 210 may register at least one component using a communication bus 300. Here, a component may refer to a module included in a program corresponding to multiple services that operate in a client. That is, a program may include a game, a messenger service, a blog, and the like, and a component may include a webpage, an avatar, a background, a text, music, a game item, and the like for configuring the game, the messenger service, the blog, and the like.

For example, a component (1) 410 and a component (2) 420 may correspond to modules included in a program (1) 4100, and a component (3) 430 and a component (4) 440 may correspond to modules included in a program (2) 4200. In this instance, when the component (1) 410 and the component (2) 420 are already registered and the component (3) 430 is to be newly registered, the component registration unit 210 may newly register the component (3) 430 using the communication bus 300. The component registration unit 210 may inform the component (1) 410 and the component (2) 420 that the component (3) 430 is newly registered, using the communication bus 300.

The component registration unit 210 may add a new component when at least one registered component is being executed.

Then, the component sharing unit 220 may allow registered components to be shared using the communication bus 300. For example, the component sharing unit 220 may allow XML data included in the registered components to be shared using the communication bus 300. Referring to FIG. 2, the component sharing unit 220 may allow data included in the components (1 through 4) 410 through 440 to be shared in a single launcher using the communication bus 300. To achieve this, the component sharing unit 220 may transmit data received from a registered component to another component through the communication bus 300.

As an example, when the component (1) 410 and the component (2) 420 included in the program (1) 4100 corresponding to a game, and the component (3) 430 and the component (4) 440 included in the program (2) 4200 corresponding to a messenger service are shared through the communication bus 300, the system for a developer interface 200 may display, via the game, information that a user logs-in to the messenger service. In this instance, when the component (3) 430 refers to a module corresponding to information about a log-in to a messenger service and the component (4) 440 refers to a design module corresponding to a font and an emoticon of the messenger service, the component (3) 430 may share the information about the log-in to a messenger service to the communication bus 300 each time a user registered in the messenger service logs-in to the messenger service. Thus, the component (3) 430 may not modify the component (3) 430 to deliver messenger information to the component (1) 410 and the component (2) 420 each time a user logs in to the messenger service.

The component sharing unit 220 may deliver the information about the log-in to a messenger service, received through the communication bus 300, to the component (1) 410 and the component (2) 420 using the communication bus 300. Then, the information about a user log-in to the messenger service may be displayed via a game. As such, the component (1) 410 and the component (2) 420 may receive information using a provided library as is. That is, the program (1) 4100 that includes the component (1) 410 and the component (2) 420 may not design a protocol or develop code to receive the information about a log-in to a messenger service.

As another example, when the program (1) 4100 corresponding to a game includes the component (1) 410 and the component (2) 420, and shares the components with a program (2) 4200 corresponding to a blog, the component (1) 410 may capture a current picture of a game in progress, and deliver the captured picture to the communication bus 300. Then, the component sharing unit 220 may deliver the received capture picture to components included in the program (2) 4200 using the communication bus 300. Thus, the capture picture may be uploaded on the blog.

As still another example, when components included in the program (1) 4100 corresponding to a game and a program (2) 4200 corresponding to a webpage are shared, the component included in the program (1) 4100 may deliver, to the communication bus 300, data for requesting a webpage associated with completing a quest related to the game. Then, the component sharing unit 220 may receive the data for requesting a webpage through the communication bus 300, and deliver the received data for requesting a webpage to components included in the program (2) 4200, using the communication bus 300. The component sharing unit 220 may deliver a webpage received from the program (2) 4200 through the communication bus 300 to at least one of the component (1)

410 and the component (2) 420 included in the program (1) 4100 using the communication bus 300. Then, the webpage associated with completing a quest related to the game may be displayed via the game.

The deregistration unit 230 may deregister a new component in response to a request for deregistering the new component while the new component is being registered. In this instance, a component that is being executed may continue to be executed even though the new component is deregistered.

The program loading unit 240 may load programs including registered components. In this instance, the program loading unit 240 may load a program including a registered component in a state where a program among programs including other registered components is loaded. Here, since registered components may be shared through the communication bus 300, the program loading unit 240 may load at least one program sharing components with the program (1) 4100 through the communication bus 300.

For example, the program loading unit 240 may load the program (2) 4200 corresponding to a messenger service in a state where the program (1) 4100 corresponding to a game is loaded. In this instance, in a state where the program (1) 4100 is being executed as a main program, the program (2) 4200 may be subordinate to the program (1) 4100 and be executed. That is, a plurality of programs may be executed in a single launcher including the program (1) 4100 executed as a main program.

The generator 250 may generate a new program using components included in a loaded program. For example, when the program (1) 4100 is loaded, the generator 250 may generate a program (3) using at least one of the component (1) 410 and the component (2) 420 included in the program (1) 4100.

When a plurality of programs are loaded, the generator 250 may generate a new program using components included in the plurality of programs.

For example, when the program (1) 4100 and the program (2) 4200 are loaded, the generator 250 may select at least one component from among a plurality of components included in the program (1) 4100 and a plurality of components included in the program (2) 4200. Then, the generator 250 may generate a new program (3) by combining the selected components.

In this instance, the generator 250 may generate at least one new component used for generating the program (3). Then the generator 250 may generate the program (3) by combining the generated new component and the selected components.

Hereinafter, an operation of generating a new program using components included in a loaded program will be described with reference to FIG. 3.

Figure 3:
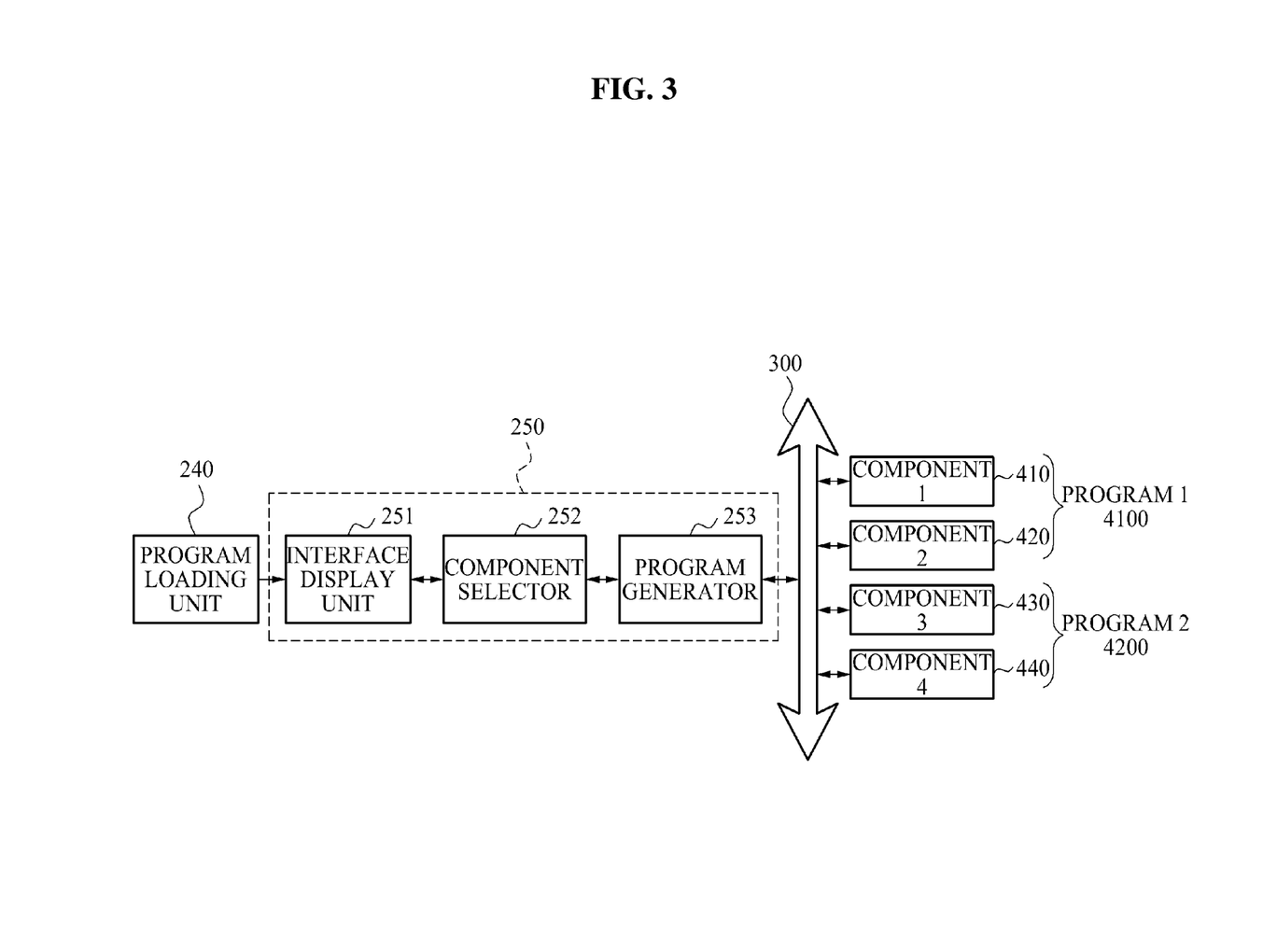
FIG. 3 is a diagram illustrating a configuration of a generator in a system for a developer interface according to exemplary embodiments of the present invention.

FIG. 3 is a diagram illustrating a configuration of a generator in a system for a developer interface according to exemplary embodiments of the present invention.

Referring to FIG. 3, the generator 250 may include an interface display unit 251, a component selector 252, and a program generator 253.

The interface display unit 251 may display, through a developer interface, components included in at least one loaded program. In this instance, a type of the components included in a program may correspond to one of a dynamic linked library (DLL) and an executable program (EXE).

As an example, when the program loading unit 240 loads a program (1) 4100, the interface display unit 251 may display, through the developer interface, a plurality of components included in the program (1) 4100. That is, the interface display unit 251 may display, through the developer interface, a component (1) 410 and a component (2) 420.

As another example, when the program loading unit 240 loads the program (1) 4100 and a program (2) 4200, the interface display unit 251 may display, through the developer interface, a plurality of components included in the program (1) 4100 and the program (2) 4200. That is, the interface display unit 251 may display components (1 through 4) 410 through 440 to a developer through the developer interface.

The component selector 252 may select at least one component from among components displayed through the developer interface. In this instance, the component selector 252 may receive an input of a component used for generating a new program (3) selected from among the displayed components. Here, a dynamic developer interface based on XML may be used as the developer interface.

For example, when the component (1) 410 corresponds to a web control module of the program (1) 4100, the component (2) 420 corresponds to a module for adjusting a picture size of the program (1) 4100, the component (3) 430 corresponds to a module associated with information about user log-ins to the program (2) 4200, and the component (4) 440 corresponds to a design module of the program (2) 4200, the component selector 252 may receive an input of the component (2) 420 and the component (4) 440 selected from among the components (1 through 4) 410 through 440 displayed through the developer interface.

The program generator 253 may generate the new program (3) by combining the selected component (2) 420 and component (4) 440.

Figure 4:
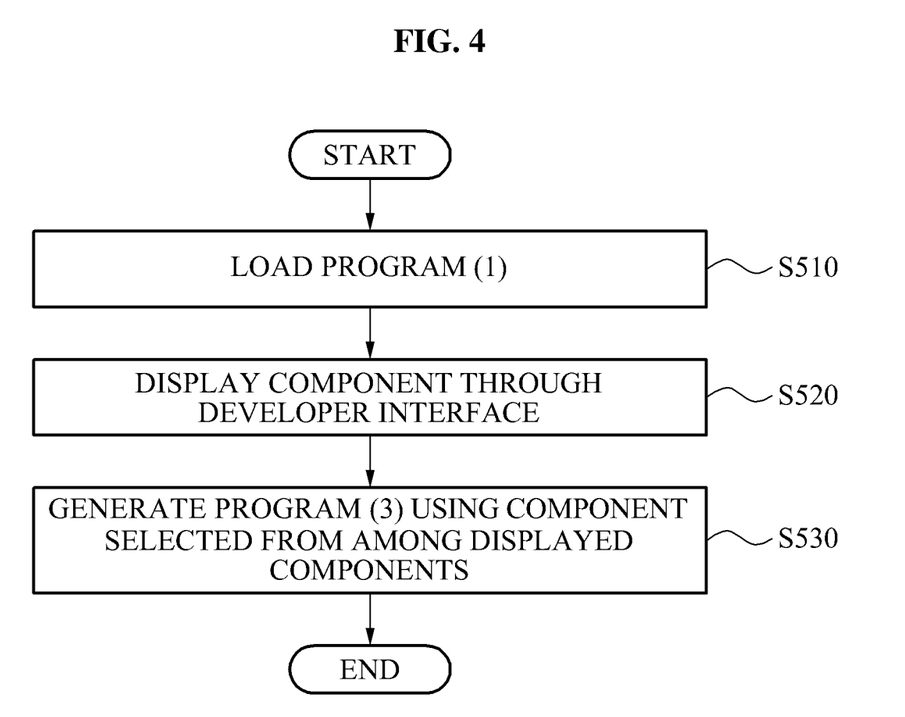
FIG. 4 is a flowchart illustrating a method of generating a new program using components included in a loaded program according to exemplary embodiments of the present invention.

FIG. 4 is a flowchart illustrating a method of generating a new program using components included in a loaded program according to exemplary embodiments of the present invention.

Initially, the program loading unit 240 may load at least one program including registered components. For example, when the program (1) 4100 and the program (2) 4200 are registered, the program loading unit 240 may load the program (1) 4100 in operation S510. In this instance, the program (1) 4100 may include the component (1) 410 and the component (2) 420, and the program (2) 4200 may include the component (3) 430 and the component (4) 440. Here, the registered components (1 through 4) 410 through 440 may be shared through the communication bus 300.

Subsequently, in operation S520, the interface display unit 251 may display components included in a loaded program to a developer through a developer interface. For example, the interface display unit 251 may display the component (1) 410 and the component (2) 420 included in the program (1) 4100 to the developer through the developer interface.

The component selector 252 may receive an input of at least one component selected from among displayed components. For example, the component selector 252 may receive, from a developer, an input of the component (2) 420 selected from among the displayed component (1) 410 and component (2) 420.

Then, the program generator 253 may generate a new program using the selected component. For example, in operation S530, the program generator 253 may generate a new program (3) using the selected component (2) 420. In this instance, when a plurality of components is selected and inputted, the program generator 253 may generate the new program (3) by combining the plurality of selected components.

The program generator 253 may generate at least one new component used for generating the program (3). The program generator 253 may generate the new program (3) by combining the generated new component and the selected component.

An operation of generating a new program through a developer interface when a single program is loaded has been described with reference to FIG. 4. Hereinafter, an operation of generating a new program through a developer interface when a plurality of programs is loaded will be described with reference to FIG. 5.

Figure 5:
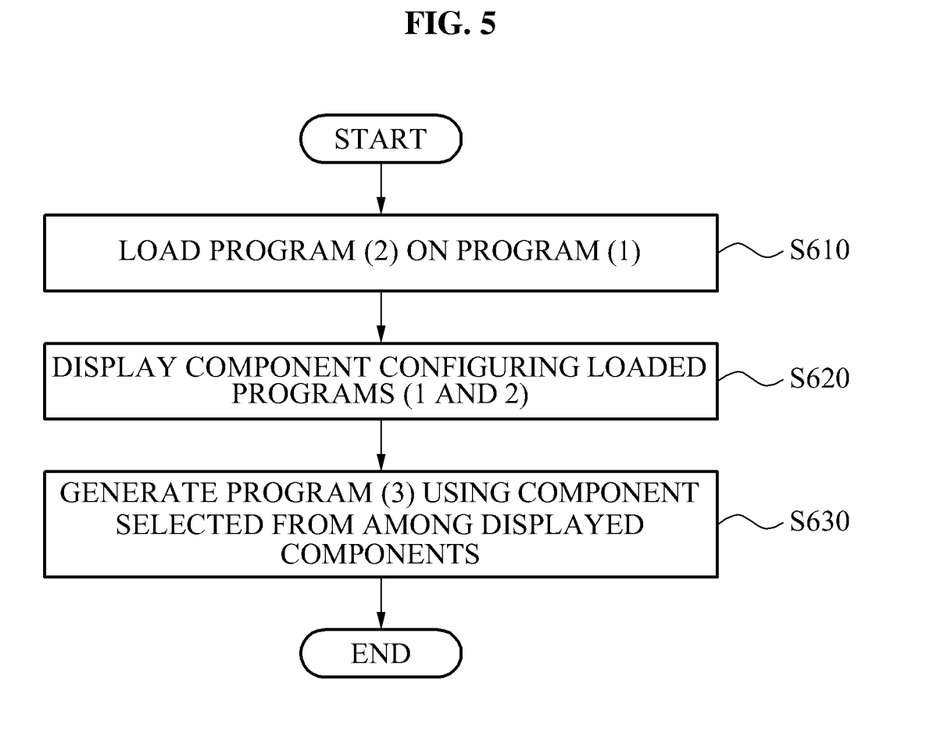
FIG. 5 is a flowchart illustrating a method of generating a new program using a plurality of components shared through a communication bus according to exemplary embodiments of the present invention.

FIG. 5 is a flowchart illustrating a method of generating a new program using a plurality of components shared through a communication bus according to exemplary embodiments of the present invention.

Referring to FIG. 5, the program loading unit 240 may load a plurality of programs including registered components. For example, when the program (1) 4100 is loaded, the program loading unit 240 may load the program (2) 4200 on the program (1) 4100 in operation S610. That is, the program loading unit 240 may additionally execute the program (2) 4200 in a launcher that executes the program (1) 4100 as a main program.

Then, in operation S620, the interface display unit 251 may display, through a developer interface, a component included in the loaded program (1) 4100 and a component included in the program (2) 4200. Here, a dynamic developer interface based on XML may be used as the developer interface.

For example, the interface display unit 251 may display the components (1 through 4) 410 through 440 to a developer through the developer interface. In this instance, a type of the displayed components may correspond to one of a DLL and an EXE.

Subsequently, the component selector 252 may receive at least one component selected from among the displayed components.

In operation S630, the component selector 252 may generate a new program using the selected component. For example, when a component (2) 420 and a component (3) 430 are selected, the component selector 252 may generate a program (3) by combining the component (2) 420 and the component (3) 430.

In this instance, the component selector 252 may generate a new component used for generating the program (3). Then, the program generator 253 may generate a new program (3) by combining the generated new component and the selected component. Thus, a developer interface may be provided so as to control components that are loaded on a program being executed by a developer, and a component may be reused since a new program is generated by combining components selected through the developer interface.

As described in the foregoing, components included in a program may include a module for controlling background music, changing a picture of a skin, controlling a button, controlling text, and controlling a tab, as well as a module for controlling a webpage, adjusting a size of a picture, information about log-ins to a messenger service, and designing. Thus, a new program may be easily and rapidly generated by selecting and combining components desired by a developer.

In the system for a developer interface 200 according to exemplary embodiments of the present invention, registered components may serialize or encode data to be delivered to the component sharing unit 220 through the communication bus 300. The component sharing unit 220 may deliver the serialized or encoded data to another component. In this instance, a component receiving the serialized or encoded data through the communication bus 300 may deserialize or decode the data.

An operation of registering a new component and sharing data between the newly registered component and an already registered component using a communication bus has been described. However, the system for a developer interface 200 according to an embodiment of the present invention may further include a deregistration unit to deregister a component in response to a request for deregistering the component among registered components. Then, the registered components may not share data with the deregistered component.

The exemplary embodiments according to the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the well-known variety and available to those having skill in the computer software arts.

It will be apparent to those skilled in the art that various modifications and variation can be made in the present invention without departing from the spirit or scope of the invention.

Thus, it is intended that the present invention cover the modifications and variations of this invention provided they come within the scope of the appended claims and their equivalents.

What is claimed is:

1. A method that uses a processor to provide a developer interface, the method comprising:
    loading, using the processor, a first program comprising a plurality of components, the plurality of components configuring the first program, and at least one third program and sharing a component with the loaded first program,
    generating, using the processor, a second program using at least one component among the plurality of components included in the loaded first program, the second program being another program comprising a different component profile from the first program; and
    displaying, through a developer interface, a plurality of components included in the loaded first program and the at least one loaded third program, wherein the loaded first program is a different program from the developer interface, and
    wherein the generating comprises:
    receiving an input of at least one component selected from among the plurality of components, displayed through the developer interface, that are included in the loaded first program and the at least one loaded third program, and
    generating the second program by combining the received input of the selected components, and
    wherein the developer interface corresponds to a dynamic developer interface based on Extensible Mark-up Language (XML).

2. The method of claim 1, wherein the generating comprises generating the second program using at least one component included in the loaded first program and at least one component included in the at least one loaded third program.

3. The method of claim 1, wherein a type of the at least one selected component corresponds to one of a dynamic linked library (DLL) and an executable program (EXE).

4. A non-transitory computer-readable storage medium comprising a computer executable program for instructing a computer, when executed, to perform the method of 1.

5. The method of claim 1, wherein the first program comprising the plurality of components is loaded on a memory to be executed by at least one processor, and wherein the second program is a program to be executed independently from the first program and to use data for the first program that is included in the at least one component.

6. A system for a developer interface, the system comprising:
a non-transitory computer-readable storage device;
a program loading unit stored on the storage device and configured to load a first program comprising a plurality of components, the plurality of components configuring the first program, wherein the program loading unit is configured to load at least one third program sharing a component with the loaded first program,
a generator configured to generate a second program using at least one component among the plurality of components included in the loaded first program, the second program being another program comprising a different component profile from the first program; and
an interface display unit configured to display, through a developer interface, a plurality of components included in the loaded first program and the at least one loaded third program, wherein the loaded first program is a different program from the developer interface, and wherein the generator comprises:
a component selector configured to receive an input of at least one component selected from among the plurality of components, displayed through the developer interface, that are included in the loaded first program and the at least one loaded third program,
a program generator configured to generate the second program by combining the received input of the selected at least one component, and
wherein the developer interface corresponds to a dynamic developer interface based on Extensible Mark-up Language (XML).

7. The system of claim 6, wherein the generator is further configured to generate the second program using at least one component included in the loaded first program and at least one component included in the at least one loaded third program.

8. The system of claim 6, wherein a type of the at least one selected component corresponds to one of a dynamic linked library (DLL) and an execute program (EXE).

9. The system of claim 6, wherein the first program comprising the plurality of components is loaded on a memory to be executed by at least one processor, and
wherein the second program is a program to be executed independently from the first program and to use data for the first program that is included in the at least one component.

* * * * *